(12) United States Patent
Nicholson et al.

(10) Patent No.: US 6,557,120 B1
(45) Date of Patent: Apr. 29, 2003

(54) SYSTEM AND METHOD FOR TESTING SOFTWARE RELIABILITY OVER EXTENDED TIME

(75) Inventors: Clark D. Nicholson, Seattle, WA (US); Michael Y. Tsang, Kirkland, WA (US); Zhiyuan Zhao, Redmond, WA (US); Haifeng Zhou, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/540,649

(22) Filed: Mar. 31, 2000

(51) Int. Cl.⁷ .................................................. G06F 11/00
(52) U.S. Cl. ........................ 714/38; 717/124; 714/31; 714/47
(58) Field of Search ........................... 717/124; 714/38, 714/47, 31, 4; 709/102

(56) References Cited

U.S. PATENT DOCUMENTS

| | | | | |
|---|---|---|---|---|
| 5,504,881 A | * | 4/1996 | Sirurget | 714/38 |
| 5,513,315 A | * | 4/1996 | Tierney et al. | 714/37 |
| 5,548,718 A | * | 8/1996 | Siegel et al. | 714/38 |
| 6,349,393 B1 | * | 2/2002 | Cox | 714/38 |
| 6,408,403 B1 | * | 6/2002 | Rodrigues et al. | 714/38 |

OTHER PUBLICATIONS

John Kirch, "Microsoft Windows NT Server 4.0 Versus UNIX", [web page], Aug. 7, 1999. http://www.unix-vs-n-t.org/kirch/. [Accessed Feb. 29, 2000].

"Benchmark Tests: Server and Advanced Server," ZDNet, [web page], Feb. 2, 2000, http://www.zdnet.com/pcmag/stories/reviews/0,6755,2426071,00.html. [Accessed Feb. 29, 2001].

"WebBench™ 3.0," ZDNet, [web page], http://www.zdnet-.com/sdbop/webbench/webbench.html. [Accessed Feb. 29, 2000].

(List continued on next page.)

Primary Examiner—Robert Beausoliel
Assistant Examiner—Christopher S. McCarthy
(74) Attorney, Agent, or Firm—Leydig, Voit & Mayer Ltd.

(57) ABSTRACT

A system and method for accelerated reliability testing of computer system software components over prolonged periods of time provides a uniform, extensible, reporting framework that includes a plurality of reporting clients, at least one controller. The system and method are adaptable for operation over a dedicated intranet as well as the Internet. It provides for tracking the reliability of system components and logs failures of varying severity that may be expected to occur over time. This data is useful, among other things, for estimating mean time between failures for software being tested and expected support costs. This information is particularly useful in providing a reliability measure where multiple independently developed software modules are expected to function together. The testing includes random scheduling of tasks and sleep intervals reflecting expected usage patterns, but at a faster pace to efficiently sample the state space to detect sequence of operations that are likely to result in failures in actual use. The method and system include using pseudo-random numbers to schedule the tasks and provides for storage of random numbers to facilitate reproducing failures, for instance for debugging efforts.

29 Claims, 6 Drawing Sheets

OTHER PUBLICATIONS

"Networking/Server," ZDNet, [web page], http://www.zdnet.com/products/networkmanager/server.html. [Accessed Feb. 29, 2000].

"Benchmark Tests: Professional," ZDNet, [web page], http://www.zdnet.com/pcmag/stories/reviews/0,6755,2426073,00.html. [Accessed Feb. 29, 2000].

"Windows 2000 Prices," ZDNet, [web page], http://www.zdnet.com/pcmag/stories/reviews/0,6755,2426075,00.html. [Accessed Feb. 29, 2000].

"How We Tested," ZDNet, [web page], http://www.zdnet.com/pcmag/stories/reviews/0,6755,2426890,00.html. [Accessed Feb. 29, 2000].

"ZD Benchmark Tests," ZDNet, [web page], http://www.zdnet.com/pcmag/stories/reviews/0,6755,2426083,00.html. [Accessed Feb. 29, 2000].

Rus Iwanchuck, "Performance Tests: Linux Servers," ZDNet, [web page], Oct. 4, 1999, http://www.zdnet.com/pcmag/stories/reviews/0,4161,2327827,00.html. [Accessed Feb. 29, 2000].

"The WebBench™ Tester's Handbook," ZD Inc., Apr. 1999.

* cited by examiner

SYSTEM AND METHOD FOR TESTING SOFTWARE RELIABILITY OVER EXTENDED TIME

TECHNICAL FIELD OF THE INVENTION

This invention relates generally to computer system reliability studies, and more particularly to the monitoring and reporting of failure characteristics of software components of a computer, including individual servers, in a computer network.

BACKGROUND OF THE INVENTION

A modem computer system is typically a complicated combination of software and hardware that has many different components for performing various functions and supporting various features. The optimal performance of a computer system frequently requires continuous monitoring and correcting problems identified through such monitoring to provide reliable operation. The need for reliability evaluation is present not only in operating an existing computer system but also in developing computer software and hardware products. For instance, during the development of an operating system, such as the "WINDOWS NT®" operating system by "MICROSOFT®" Corporation, various components of the operating system are constantly being tested by subjecting them to strenuous operating conditions and observing whether they can withstand the heavy usage without failure. Such a performance study, often termed "stress testing," helps the software developers to identify the weak spots or defects in the components of the operating system and provides valuable information as to the causes of failure.

Many modem products are a combination of software and hardware. Testing such products is more difficult since the software should be tested against other software and hardware products, which may be unavailable if they are in development by third parties. Furthermore, the degree of reliability that can be assured for a software/hardware unit is sensitive to prior knowledge of likely uses to which the software/hardware unit is put.

It is common experience that computer software and hardware frequently fails even with extensive stress testing by the manufacturer to ensure reliability. An important reason is that all possible combinations of inputs, outputs and internal operations, in effect the universe of states of a computer or a network, are too large to be exhaustively tested. It is customary to stress test each component by overloading it by performing a particular task repetitively. Examples of such tasks for software include read and write operations, mathematical calculations and the like. The often unfulfilled expectation is that a system comprising different stress-tested components will continue to be reliable.

In the modern marketplace it is impractical for a single entity to supply all of the needs of customers. Thus, third-party products that inter-operate with a product to be tested are an unavoidable complication in the testing procedure. However, the cost of providing after sales service to make various combinations of products operational is not distributed amongst different manufacturers in proportion to their contribution to system failure. In particular, a supplier of an operating system is more likely to field support calls than the suppliers of software that uses the operating system because the average consumer is unlikely to accurately identify the true cause of a failure.

In addition, there is an underlying expectation that the operating system manufacturer should ensure some level of reliability. The substantial cost of testing and providing after sales service, including responding to complaints due to defective third party supplied software, has to be budgeted in the cost of manufacturing and marketing an operating system or related software. Consequently, it is not uncommon to encounter certification requirements placed by the operating system manufacturer for permitting claims of compatible products by other manufacturers.

Software developers of operating systems seek to include features and functions that they believe will make the corresponding hardware both more useful and easier to use, including the creation of additional software that uses the operating system. Not surprisingly, operating systems can be quite complex as they often include a variety of features. Examples of operating systems include the "WINDOWS CE®" for hand held devices and the "WINDOWS 98" operating system.

The market for operating systems may be conveniently divided in accordance with the complexity required from the operating system and the underlying hardware. Use of commonly available hardware results in lower costs due to increased competition between hardware manufacturers. Thus, a desirable low cost operating system should allow use of widely available hardware to better compete in the relevant market. A result of a division based on complexity provided in the operating system results in reduced expected support costs for testing and after sales service since simpler operating systems are likely to incur lower costs. Competitive concerns require that such cost savings be passed on to the consumer, when possible, to better compete in the marketplace. However, it should be noted that testing cheap or simple software or software/hardware hybrids is not intended to be a limitation.

An example of an exemplary market segment is provided by the small enterprises' need for servers. Typically, a small business cannot afford to hire system analysts or incur the costs charged for over the telephone or online trouble shooting or backup servers. On the other hand, the server requirements for a small enterprise are quite modest as a rule, being limited to serving a small number of machines and in executing routine file sharing and printer sharing services combined with limited Internet access. At the same time, it is not desirable for a small enterprise manager to opt for a system configuration that results in dependence on a single manufacturer.

Pricing a general purpose operating system, then, requires inclusion of costs for testing and supporting a complex system, although many of the features may have little utility for a small enterprise. Furthermore, the presence of additional features inevitably compromises the product since the desired reliability, by a small enterprise, of continuous operation measured in years is difficult to provide in complex operating systems with a multitude of functions. These considerations apply equally well to other software products.

Thus, there is a need to supply such market segments with software products that are priced to reflect their actual cost of support and development while allowing the consumer extensive choices. In case of software it is often possible to manufacture products that more than meet the needs of a market segment by including extensive functionality. Furthermore, to the extent there are cost savings possible due to the nature of the market segment definition, competition requires that such savings be passed on to the consumer. Such savings can be realized by better testing regimes that reflect the actual likelihood of failure for the particular product, including product configurations with limited functionality.

Existing reporting tools for reporting the results of system performance studies, however, do not satisfactorily meet these testing needs. In addition, the almost complete product is tested via one or more β-releases. Such testing relies on experienced software users putting the product through its paces and reporting back results to the manufacturer. Consumer feedback is yet another source of data for improving the product in subsequent releases or piecemeal fixes. However, the latter is an expensive strategy, both for the manufacturer and the consumer, and it can earn the manufacturer the wrath of irate consumers. Thus, a better method and system are needed to test the reliability of software and hybrid software/hardware products that are designed to interoperate with third party products. Furthermore, it is desirable to accurately estimate the long term operation of the product to enable better pricing and marketing decisions.

SUMMARY OF THE INVENTION

In view of the foregoing, the present invention provides a uniform, easily extensible, reliability reporting framework that includes a plurality of reporting clients that concentrate on tracking and reporting reliability data. This framework provides testing that goes beyond traditional stress testing by estimating actual product reliability over a long period of time, and not necessarily just heavy use. Furthermore, measuring different kinds of failures expected over extensive periods of simulated operation allows more accurate pricing and estimated support costs for interoperating third party products and their compatibility.

The testing method and system includes operating a software product of interest in different conditions chosen to reflect real world conditions. The frequency of operation is proportionally increased to compress expected operations over a long period of time into a shorter and more reasonable testing period to reduce the cost of testing while providing data that is meaningful in estimating prolonged operation of the product. Preferably, an accelerated life test ("ALT") controller coordinates the testing.

Furthermore, the testing includes random scheduling of tasks and sleep periods to better sample the state space. This results in superior identification of possible failures, including catastrophic failures, compared to mere stress testing since it samples failure states that are not detected by traditional stress testing or periodic testing. Finally, the use of pseudo-random numbers allows for testing uncorrelated activities while allowing easy reconstruction of a failure for debugging and improving the product being tested.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed in a computing environment. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Figure 1:
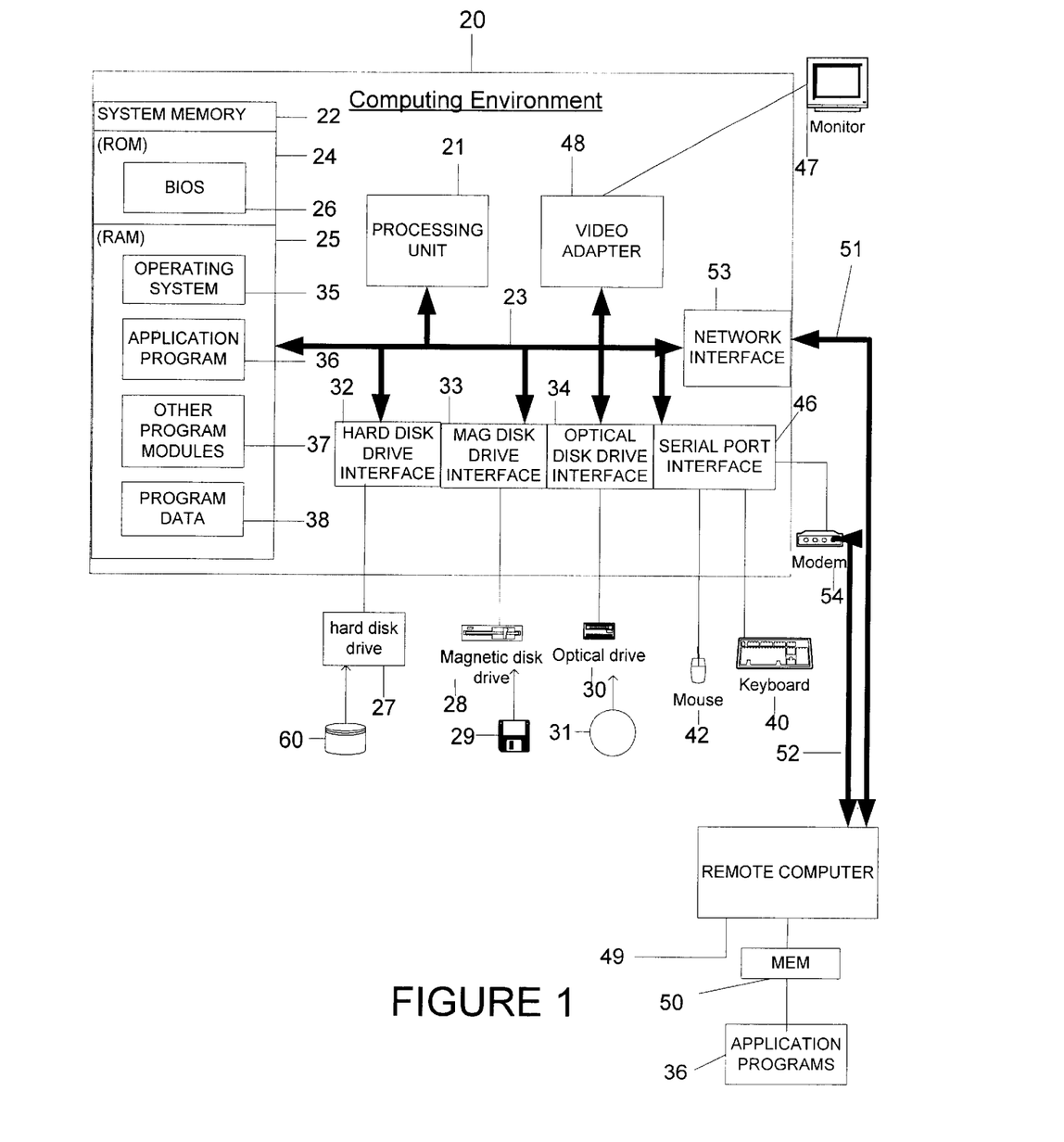
FIG. 1 is a block diagram generally illustrating an exemplary computer on which the present invention may be implemented.

With reference to FIG. 1, an exemplary system for implementing the invention includes a general purpose computing device in the form of a conventional computing environment 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system (BIOS) 26, containing the basic routines that help to transfer information between elements within the computing environment 20, such as during start-up, is stored in ROM 24. The computing environment 20 further includes a hard disk drive 27 for reading from and writing to a hard disk 60, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer readable instructions, data structures, program modules and other data for the computing environment 20. Although the exemplary environment described herein employs a hard disk 60, a removable magnetic disk 29, and a removable optical disk 31, it will be appreciated by those skilled in the art that other types of computer readable media which can store data that is accessible by a computer, such as magnetic cassettes, flash memory cards, digital video disks, Bernoulli cartridges, random access memories, read only memories, and the like may also be used in the exemplary operating environment.

A number of program modules may be stored on the hard disk 60, magnetic disk 29, optical disk 31, ROM 24 or RAM 25, including an operating system 35, one or more applications programs 36, other program modules 37, and program data 38. A user may enter commands and information into the computing environment 20 through input devices such as a keyboard 40 and a pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is preferably connected to the system bus 23 via an interface, such as a video adapter 48. In addition to the monitor, computing environments typically include other peripheral output devices, not shown, such as speakers and printers.

The computing environment 20 may operate in a networked environment using logical connections to one or more remote computers, such as a remote computer 49. The remote computer 49 may be another computing environment such as a server, a router, a network PC, a peer device or other common network node, and typically includes many or all of the elements described above relative to the computing environment 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the computing environment 20 is connected to the local network 51 through a network interface or adapter 53. When used in a WAN networking environment, the computing environment 20 typically includes a modem 54 or other means for establishing communications over the WAN 52. The modem 54, which may be internal or external, is connected to the system bus 23 via the serial port interface 46. In a networked environment, program modules depicted relative to the computing environment 20, or portions thereof, may be stored in the remote memory storage device. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

Figure 2:
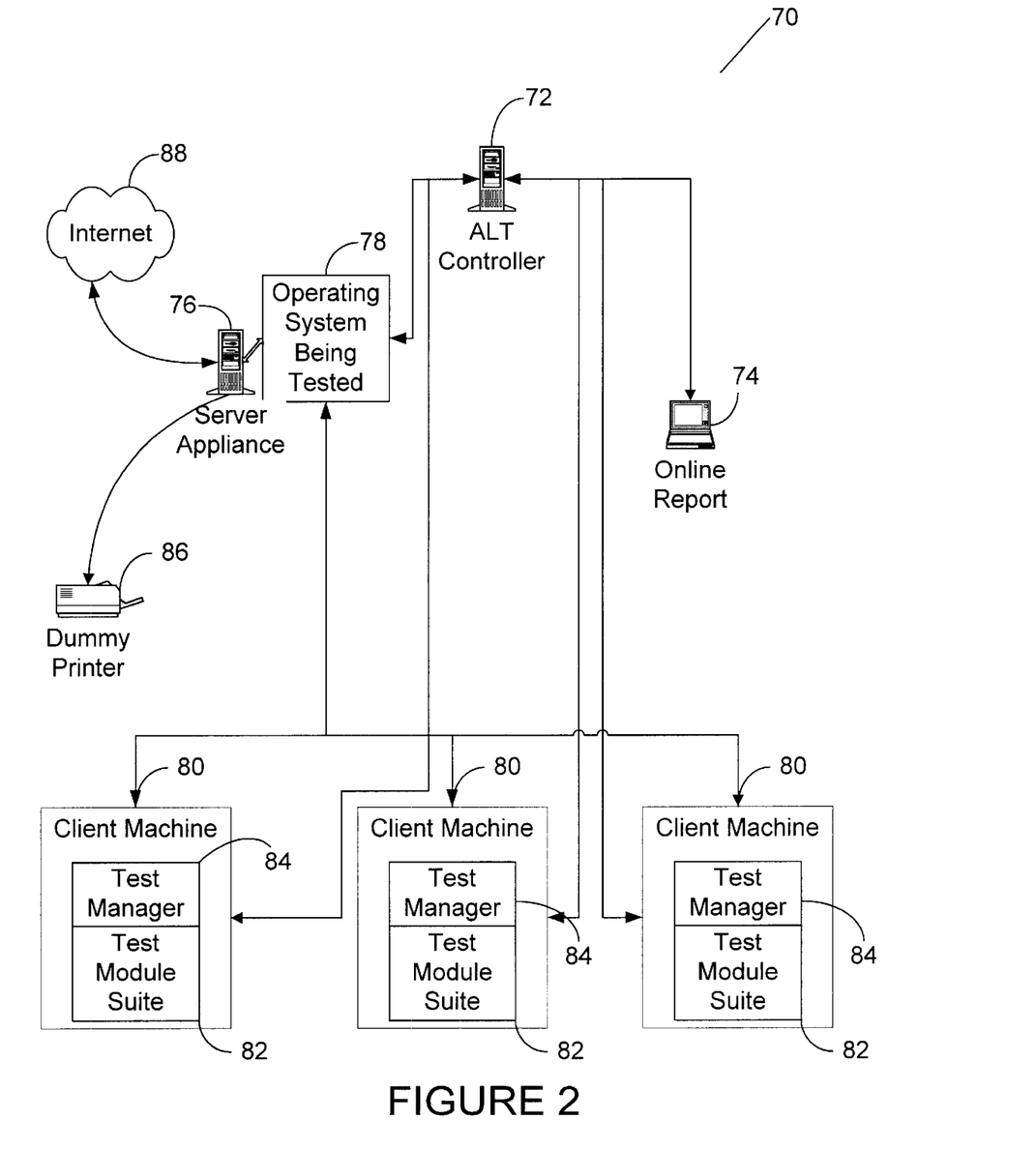
FIG. 2 is a schematic diagram showing a network for testing an operating system for a server using an ALT controller.

Referring now to FIG. 2, the present invention is illustrated by an improved way to collect and report reliability data that provides extensibility in data collection and consistency, ease, and uniformity in reporting the results of the reliability monitoring in testing a server operating system. As shown in FIG. 2, a networked testing computer system 70 may include several machines that have distinct functions although many of these functions may be performed on a single machine in alternative embodiments. Each of these machines provides a computing environment similar, but not necessarily identical, to the computing environment 20 in FIG. 1. Thus, client machines 80, server appliance 76 and accelerated life test ("ALT") controller 72 are, preferably, individually similar to the computing environment 20.

In particular, network 70 has an ALT controller 72 connected to a facility for outputting online test report 74, a server 76 hosting the operating system being tested 78 and a plurality of client machines 80 that are connected to server 76 and have client test modules 82 specifying the details of the testing procedure. In addition, the server 76 may also be connected to a dummy printer 86 for executing print job requests and the Internet 86.

Figure 3:
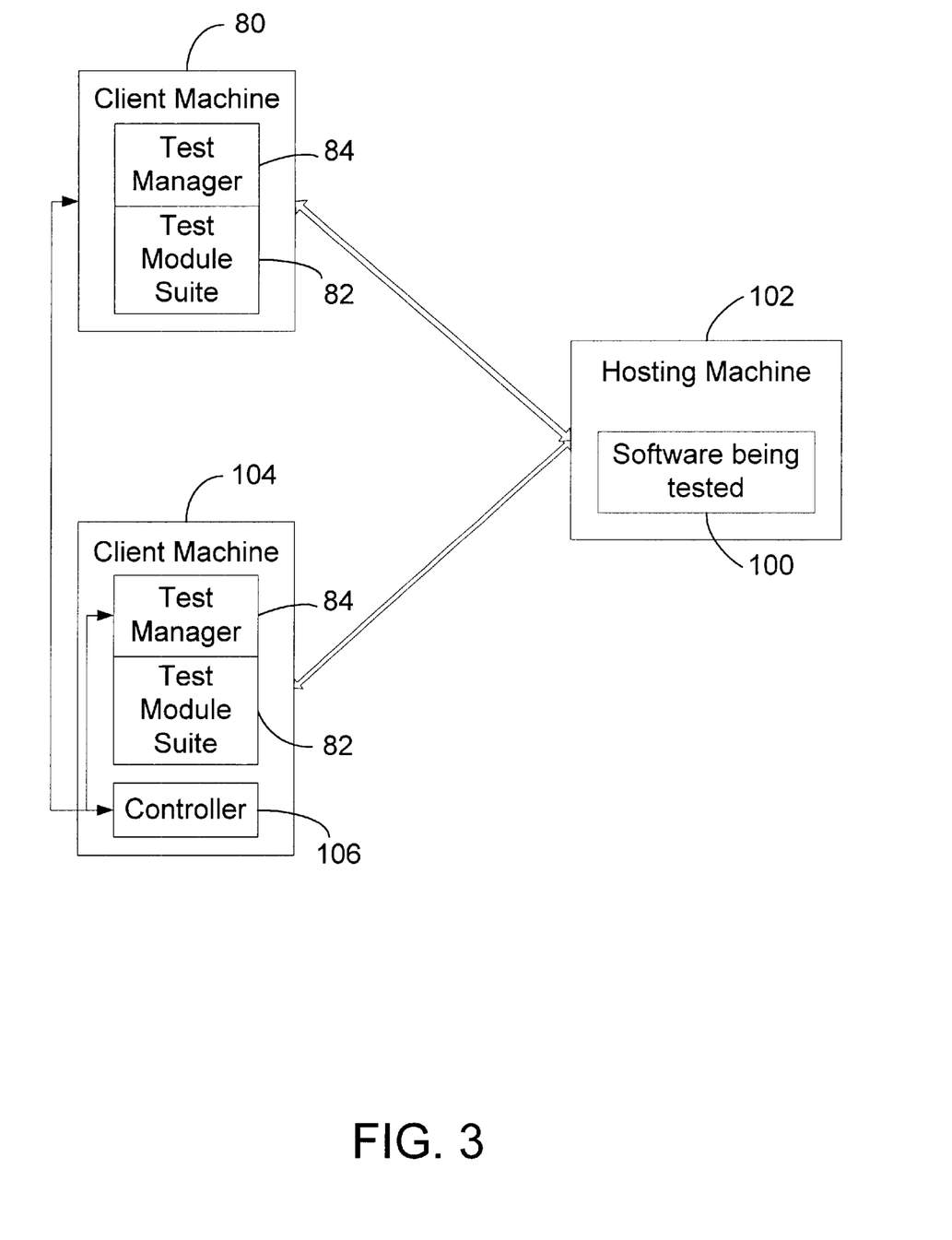
FIG. 3 is a schematic diagram showing an alternative implementation for the ALT controller.

While FIG. 2 illustrates an embodiment for testing a server operating system with the ALT controller being a distinct physical entity in the network, this is not a requirement for implementing embodiments in accordance with the invention. As shown in FIG. 3, a reporting system in accordance with the invention includes client machines that are not identical and the ALT controller may be implemented on the same machine that hosts the client test modules and/or the software being tested. The configuration in FIG. 2 is preferred, however, due to the ease of interpreting test results.

Specifically, FIG. 3 shows software being tested 100 on hosting machine 102 connected to a client machine 104 hosting an ALT controller module 106, a test module suite 82 and a test manager 84. In some embodiments the test manager 84 and the ALT controller 106 may be implemented as a single process. In the illustrated embodiment, ALT controller 106 and test manager 84 can communicate, e.g., using inter-process communications. In addition, there is an additional client machine 80, hosting a test module suite 82 and a test manager 84. In this embodiment, preferably, the different modules execute in their own separate process space and are isolated from each other to permit effective testing of software being tested 100.

Figure 4:
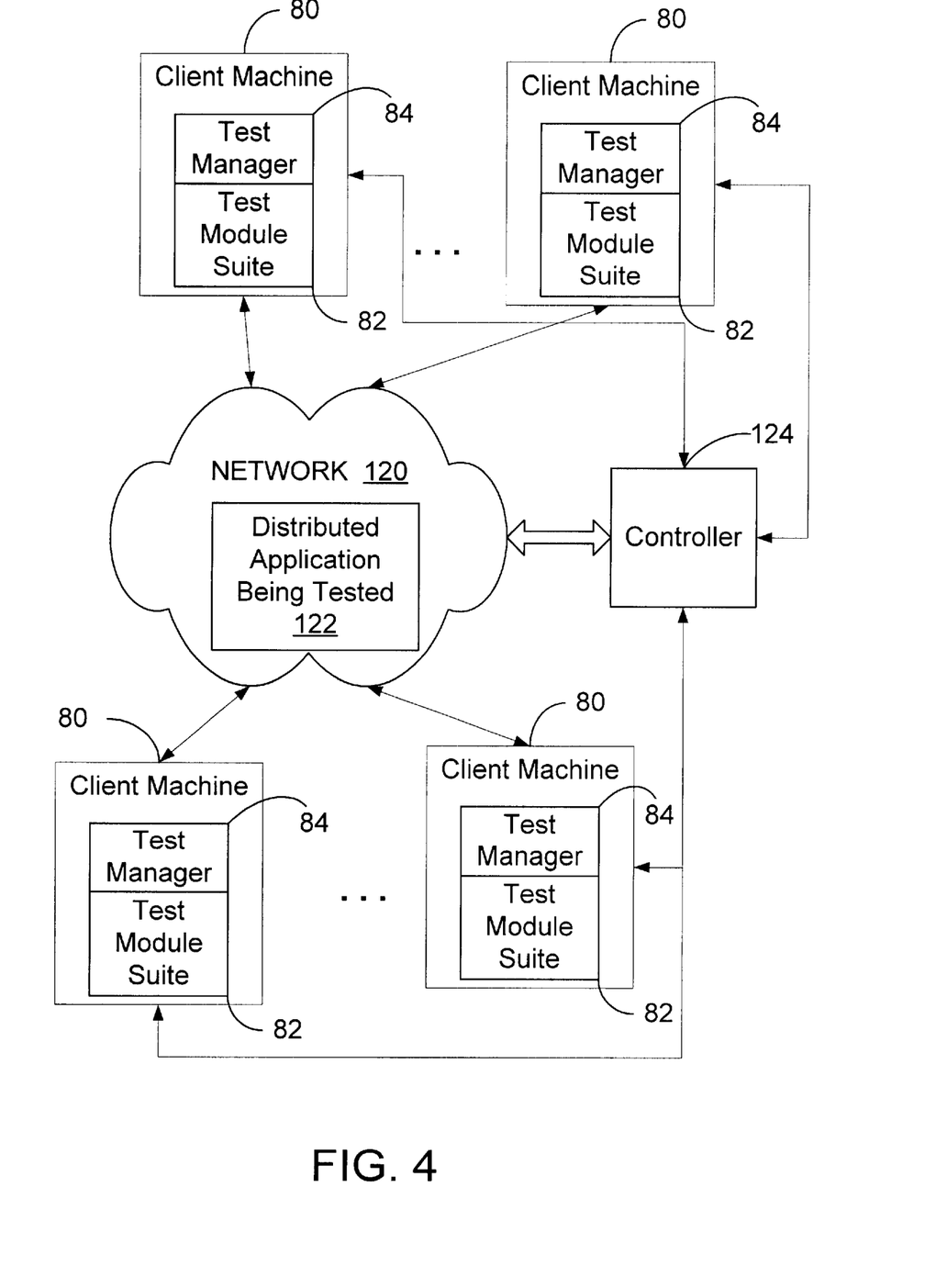
FIG. 4 is a schematic diagram showing another embodiment in accordance with the invention for testing a network wide software/hardware hybrid product.

FIG. 4 illustrates another embodiment of the invention for using ALT to estimate reliability of test software or software/hardware device implemented as network entity, e.g., using DCOM. A distributed application being tested 122 on a network 120 is tested by ALT controller 124, which in turn directs and coordinates clients 80 in presenting tasks to the distributed application 122 and evaluating the responses of the distributed application being tested 122 along with the network 120. The distributed application being tested 122 could be implemented using a variety of tools such as Distributed Component Object Model ("DCOM") based technologies. Consequently, a variety of software and software/hardware hybrids may be tested in accordance with ALT, including, but not limited to, multitasking operating systems such as "WINDOWS®," "UNIX®" family of operating systems or other operating systems suitable for personal and/or networked computers.

A preferred embodiment for ALT testing is similar to customary stress testing in so far a controller is employed to coordinate the course of the test and the data archiving and analysis. However, the ALT controller performs many functions that set it apart. Stress testing requires a task to be performed at high rates or extreme conditions. Software, however, presents novel problems since many significant failure states are not encountered in routine stress based operations. Instead, stress testing may result in failure of the testing method due to the repetitive sampling of similar robust states of the software while avoiding failure states. While visiting every state possible for complex software is not feasible in general, the method and system in accordance with the invention disclose a superior approach that makes possible a greater likelihood of visiting states likely to be encountered in course of actual use.

As noted previously, the stability and robustness of a software or software/hardware product affects pricing and market segmentation decisions. As an example of such a product is an operating system software platform that allows various third party hardware providers to develop low cost, easy to use, headless server appliances for very small organizations ("VSORGs"). These server appliances should provide shared printing, file access, file back up and restore, and Internet access to the employees of the VSORG. The end customer is assumed to have very limited understanding of networking and computers and consequently the product must be extremely reliable and easy to use. It must have a user experience similar to a television: plug it in, hook up the cable, turn it on, and start channel surfing.

However, to ensure this degree of reliability, measurable in the lack of a need to reboot the system over a time period measured in years, the operating system has to be tested thoroughly with the objective of reliably predicting the mean time between failures ("MTBF"). In addition, various other sources of system failure are identified and evaluated independent of the desired reliability of the operating system. In general, the server should continue to work without locking up or crashing. To this end, white box testing can be combined with ALT by modifying the code to look for resource leaks and other problems that may appear in course of prolonged operations. This can speed testing significantly and identify problems that fail to develop into actual failures during conventional testing.

Some desirable properties of such a server operating system are listed below:

TABLE 1

| Desired Property | Significance |
| --- | --- |
| Small ROM and RAM footprints | The core operating system must fit in low cost server hardware and must allow for highly reliable operation even in the case of a disk drive failure. |
| Headless operation | The core operating system must be capable of running in a server without keyboard, mouse, or monitor. |
| Reliable | The server must not require the user to attend to it after it has been turned on and configured. |
| Field Upgradable | The core operating system must allow for upgrades and updates by the end user to fix bugs and increase functionality after purchase. |
| Extensible | The core operating system must allow additional services to be added. |
| Migration | The core operating system and associated utilities must make it easy for a customer to migrate to upgrades quickly and easily. |

ALT Testing also allows evaluation of the effectiveness of additional strategies for making a server appliance maintenance free. For instance, an automated reboot or restart of the operating system, or switching to an alternative operating system, if a fatal error is detected could be deployed or offered by third parties packaging multiple operating systems. Similarly, failures due to hard drive crashes or failure to connect to the Internet due to modem failures. or invalid URLs are unrelated to the reliability of the operating system, and hence will be experienced by any operating system. They will be detected by testing in accordance with ALT in a suitably configured server under testing.

However, failures due to a particular sequence of tasks or command execution or peculiar periodicity associated with customary use are likely to be encountered in actual use but may be missed in stress testing. These are advantageously detected by requiring the server operating system being tested to perform tasks that are executed in a manner suggestive of actual usage patterns. In addition, it is desirable to allow failures that are actually encountered during testing to be reproduced at a subsequent time in order to permit debugging the software. Reproducibility of failures is advantageously aided by the ability to recover a state leading to the failure.

In accordance with the invention, in contrast to stress testing, in order to evaluate reliability, the server operating system is subjected to multiple tasks and sleep periods where the alternation between task execution and sleep reflects the expected usage patterns. Moreover, most server operating systems are subjected to alternating day and night time use. Similarly, many operations such as file reads/writes, Internet access, and the like are likely to follow random distributions. However, recovering the state of a failure encountered during testing could be a problem for randomly scheduled tasks. In addition some failures are due to a memory/resource leakage, which may, in turn, lead to a progressive system slow down. Reproducing a failure by allowing evaluation of states leading to the failure is a potentially significant benefit.

In this context, it is important to understand the notion of the state of a computer or process. The state of a process is initialized upon launching a software package, at least from the perspective of a software package having its own process space. The state of the computer depends on the precise sequence of operations, including housekeeping chores and operations due to applications executing on the computer. It is desirable that the operating system ensures that independent software modules execute in their own process space so that failure of any particular software module does not affect another software module. However, this ideal is often not possible and software may attempt, for instance, to access prohibited memory resulting in either termination of its corresponding process or a system crash. While not all problems justify the effort to correct them, problems that result from expected patterns of use should be identified and corrected. ALT allows both the identification and reproduction of such operations resulting in a failure.

A helpful concept is to estimate the expected use of, in this case, the server operating system, over a period of interest—say a year. Then the expected operations are performed, in accordance with a randomized schedule over a smaller interval of time—say twenty days. The randomized schedule is generated using a Gaussian distribution and random numbers to obtain start times for the various tasks and sleep periods. In addition, the schedule can reflect the expected periodicity of various operations such as day usage versus nighttime use. An exemplary list of the expected frequencies of operations to be performed on a server operating system in a VSORG is provided in Table 2, where "mtbt" stands for mean time between tests," i.e., sleeping time, below:

TABLE 2

| Estimated Frequency | Explanation |
| --- | --- |
| 5760 shares mapped/disconnected from a pseudo-random selection of 12 PC clients. mtbt = 300 sec (5 min) | Represents 12 PCs being power cycled 2 times per day at 240 days per year. |
| Several Word ® and Excel ® documents of various sizes are opened, edited, and closed 28800 times from a pseudo-random selection of 12 PC clients. Files are held open for a random period time ranging up to 4 hours. mtbt = 60 sec (1 min) | Represents 12 PCs accessing Word and Excel documents off the file server 10 times per day at 240 days per year. |
| Several files of various sizes are copied from the server to a random PC client and back again 14400 times. The file content is checked to make sure there was no data 1055. mtbt = 120 sec (2 min) | Represents 12 PCs copying files to and from the file server 5 times per day 240 days per year. |
| 28800 print jobs of random sizes are sent to the server from a pseudo-random selection of 12 PC clients. mtbt = 60 sec (1 min) | Represents 12 PCs sending 10 jobs per day at 240 days per year. |
| 5760 Internet accesses connections are made/broken with a pseudo-randomly selected external ISP from a pseudo-random selection of 12 PC clients. After each connection is made xMB of data is transferred per connection from y web sites. Here x is a pseudo-random number between 0.1 and 1.0 and y is a pseudo-random number between 1.0 and 5.0. These transfers are made via both http and ftp. After a connection is made z email messages are read from an ISP email server, where z is a pseudo-random number between 1 and 20. mtbt = 300 sec (5 min) | Represents 12 PCs connecting to an ISP 2 times per day at 240 days per year. Once connected the test simulates reading 1 to 20 email messages and linking to several different web sites and transferring pages ranging from 0.1 MB to 1 MB or transferring files via ftp. |
| 240 pseudo-random operating service configuration changes are made from a pseudo-random selection of 12 PC clients. These include adding user, deleting a user, turning a service on/off, creating a folder, deleting a folder, and the like. mtbt = 300 sec (5 min) | Represents an administrator or user if security is turned off, changing the configuration of the system 1 time per day. |
| 5760 DHCP IP address renewals are made from a pseudo-random selection of 12 PC clients. mtbt = 300 sec | Represents 12 PCs being power cycled 2 times per day at 240 days per year. |
| 57 DHCP IP address releases are made from a pseudo-random selection of 12 PC clients. mtbt = 30315 sec (8.4 hours) | Represents 1 year's worth of PC clients being taken off the network, new PCs being brought online, and new NICs being installed in existing PCs. |
| 50 file system restoration operations are made along with 100 individual file restoration operations. In the case of support for file compression these tests should be run with random combinations of compression on and off. mtbt = 11520 sec (3.2 hours) | Represents the entire user file system being restored once per week and an individual file being restored twice per week. |
| 52 File system backups are made. In the case of support for file compression these tests should be run with random combinations of compression on and off. mtbt = 33230 sec (9.2 hours) | Represents the entire user file system being backed up once per week. A random user will forget to attempt to use the system when the backup occurs. |
| 10 graceful power cycles of system are made, e.g., using the power switch. Presumably, the server appliance will have some kind of soft power switch that signals the OS of impending shutdown, waits some amount of time and then shuts off the power. This test may be omitted when attempting to verify a full year of operation with no power cycling. mtbt = 2 hours | Represents the users properly power cycling the server to move it or shut it down 10 times per year, but forgetting to tell everyone. |
| 2 ungraceful power cycles of the system are made by, e.g., unplugging the power cord. This test may be omitted when attempting verify a full year of operation with no power cycling. (This test may not be necessary if server appliance hardware spec requires soft shutdown using batteries.) mtbt = 10 hours | Represents the power going down or someone tripping over the power cable twice per year. |
| x failures of each of the following key hardware components at random times during the test are simulated as follows: 10 LAN failures- cable may be disconnected and/or a noise generator used to saturate the network; 1 - modem failure - phone/ISDN cable by, e.g., disconnecting the cable; 1 hard drive failure - IDE/SCSI cable represented by, e.g., disconnecting the cable; 10 printer failures - printer cable is disconnected or power cycled; and 10 tape drive failures - tape drive may be removed and/or cable disconnected. | Represents modem, LAN, printer, tape drive, and hard drive component failures x times per year. |

In Table 2 above, the estimate of 240 days in a year reflects 240 working days after accounting for holidays and weekends. It is to be noted that the operations include a specification of a mean time between testing, which is a sleep period that is scheduled along with a particular task in accordance with a random distribution. The exemplary estimates in Table 2 can be substituted with suitable usage patterns for the product being subjected to ALT with no loss of generality. Similarly, suitable random probability distributions may be used instead of the Gaussian distribution to schedule start times for tasks and sleep periods.

While there are various measures for evaluating whether a procedure generates acceptable random numbers, preferably, random numbers are generated using a procedure that provides a sequence of numbers that are not correlated over the scale of the test, possibly measured as being below a threshold for a correlation measure. Furthermore, it is desirable that these numbers be reproduced, e.g. when tracking and debugging failure states. This requires that a deterministic procedure be used to generate the random numbers in combination with storage of one or more initial seeds used to generate the numbers.

In reliability testing in accordance with ALT pseudo-random numbers are suitable for most purposes. A popular strategy is to use an algorithm for sampling a rather large range of numbers in a uniform fashion, i.e., without a preference for any particular part of the range. Advantageously, a random number so generated can be used as the seed for the next round of generating random numbers. Thus, storing an initial seed, or sets of seeds, provides all the information for generating subsequent numbers, while ensuring that the subsequent numbers are random. Preferably, although this is not a requirement, pseudo-random numbers correspond to white noise in their probability distribution over the range in which they are generated. Most computer systems provide one or more pseudo-random number generator routines, e.g. "Visual Basic®" function rnd( ).

The pseudo-random numbers used in some of the embodiments are 32 bit numbers to provide a large range that is sampled by the random number generator. These numbers can be scaled to get a random number distributed in a prescribed range followed by using a distribution of interest, such as the Gaussian distribution, to obtain numbers distributed in accordance with a desired probability distribution function. Use of the random numbers is illustrated next in an embodiment of the invention.

In this embodiment a task is scheduled for execution following a Sleep_Period, which is calculated using a random number. An exemplary estimate for the sleep periods may be obtained as:

Sleep_Period=2*(Random_Number)*total_time/number_of_Task_runs

In the above equation Random_Number is in the interval (0,1), although the equation can be scaled to accommodate another range. The total_time is the compressed time of actual operations being tested. For instance, if operations normally performed in a year are performed in the course of twenty days of ALT, then total_time is 20 days. The number_of_task runs is the estimated number of times this task will be performed by the customer in the time interval of interest, for instance 1 year.

In an embodiment of the invention, a client module sleeps for the prescribed period of time (Sleep_Period), run the test module (i.e., task) and following that, in accordance with a new Sleep_Period estimate, sleeps again. In addition, a Day_Factor or a Night_Factor to make the testing even more realistic may be advantageously used to modify the Sleep_Period. Some exemplary Day_Factor or Night_Factor may be calculated as:

Day_Factor=(½)*(1(1−NAL));

and

Night_Factor=(½)*(1/NAL);

where NAL=number_of_tasks_run_at_night/total_number_of_tasks denotes night activity level assuming night time lasts for half a day. Changes in the fraction of day unit considered to be day time are accounted for by suitably modifying the (½) factor in the equations above. In order to use the night and day time factors, the total time is tracked in units of "days" to permit scheduling more tasks during the day than at night by modulating the sleep period. In an embodiment of the invention, then, the equations for the day and night time activities are modified as:

Sleep_Period=2*(Random_Number)*Night_Factor*total_time/number_of_Tasks

Sleep_Period=2*(Random_Number)*Day_Factor*total_time/number_of_Tasks

The day time equation is used during the day period, which may be defined as a fraction of the "day" unit mentioned above. Similarly, the night time equation is used in the remaining fraction of the "day" unit. A useful strategy is to use the day time equation to calculate Sleep_Period for half of the "day" unit.

Turning to the ALT controller for implementing the testing protocol, an embodiment may use a physically distinct machine in an intranet as illustrated by ALT controller 72 in FIG. 2. In an embodiment of the invention, ALT controller 72, which may be implemented on a machine running a server operating system, such as "WINDOWS NT®" manufactured by "MICROSOFT®" corporation of Redmond, Wash., provides a plurality of client machines 80, each of which is physically connected to operating system being tested 78. The test module suites 82 are, in general, not identical, and preferably contain code to execute at least one task. It should be understood that the precise physical connections can be varied to implement the desired logical connections in the embodiment in FIG. 2, as is also illustrated in FIGS. 3 and 4.

ALT controller 72 also initializes the server operating system being tested 78 on the server appliance 76 for testing. The ALT controller 72, furthermore, provides a seed to generate random numbers to each of the client machines. Each of the client machines has a test manager 84 for coordinating the execution of the Test Module Suite 82 in accordance with a test schedule and the provided seed. Conveniently, a pseudo random number generator is used to generate subsequent random numbers from the initial seed provided to a particular client machine although more than one kind of random number generators can be used. This generated random number, following suitable scaling, is used to determine a time for initiating a task or sleep period using a selected distribution. An example of such a distribution is the Normal distribution with a specified mean value and standard deviation.

Figure 5:
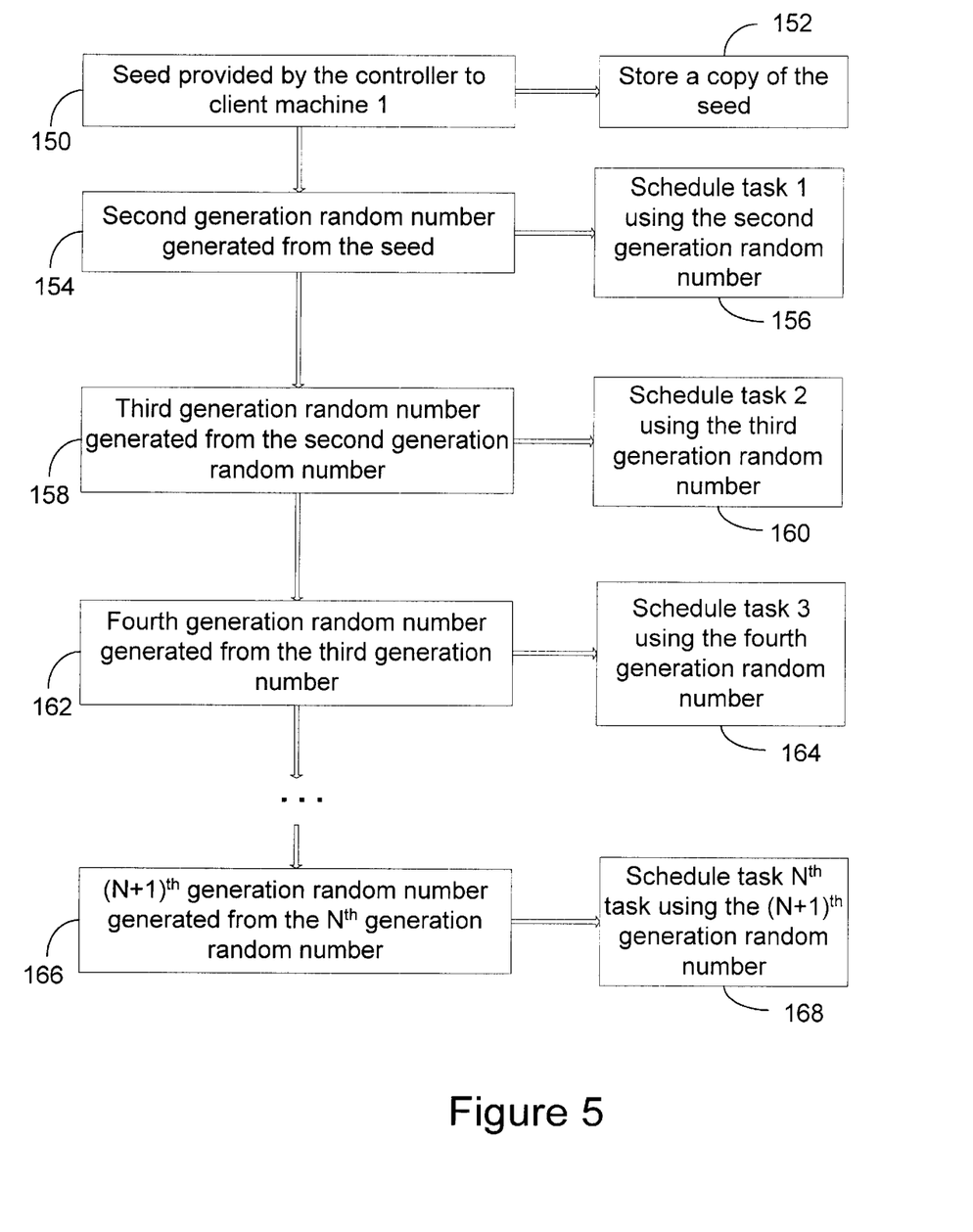
FIG. 5 illustrates generation and use of random numbers in an embodiment of the ALT testing strategy.

FIG. 5 illustrates the relationship between the random number seed and the subsequent random numbers generated from the provided seed at a machine and the tasks scheduled using the seeds. It provides a general method for using of random numbers to schedule a plurality of randomized tasks. These tasks include selecting a test module, selecting parameters for executing a selected test module, computing a Sleep_Period and the like. For instance, in the context of FIG. 2, 72 provides a seed to one of the client machines 80 in step 150. ALT controller 72 also stores a copy of the seed in step 152. Client machine 80 uses the seed to generate a second-degree random number (step 154) and uses the second generation random number to schedule a first task (step 156). Similarly, a third generation random number is generated (step 158) and used to schedule a second task (step 160). This is followed by generation of a fourth generation seed (step 162) and the scheduling of a third task using the fourth generation random number (step 164). This process is continued until the last task, the $N^{th}$ task has been scheduled (step 166) using the $(N+1)^{th}$ generation random number. Naturally, variations such as reusing a random number or variously ordering the generation of random numbers are intended to be included within the scope of the embodiments.

Figure 6:
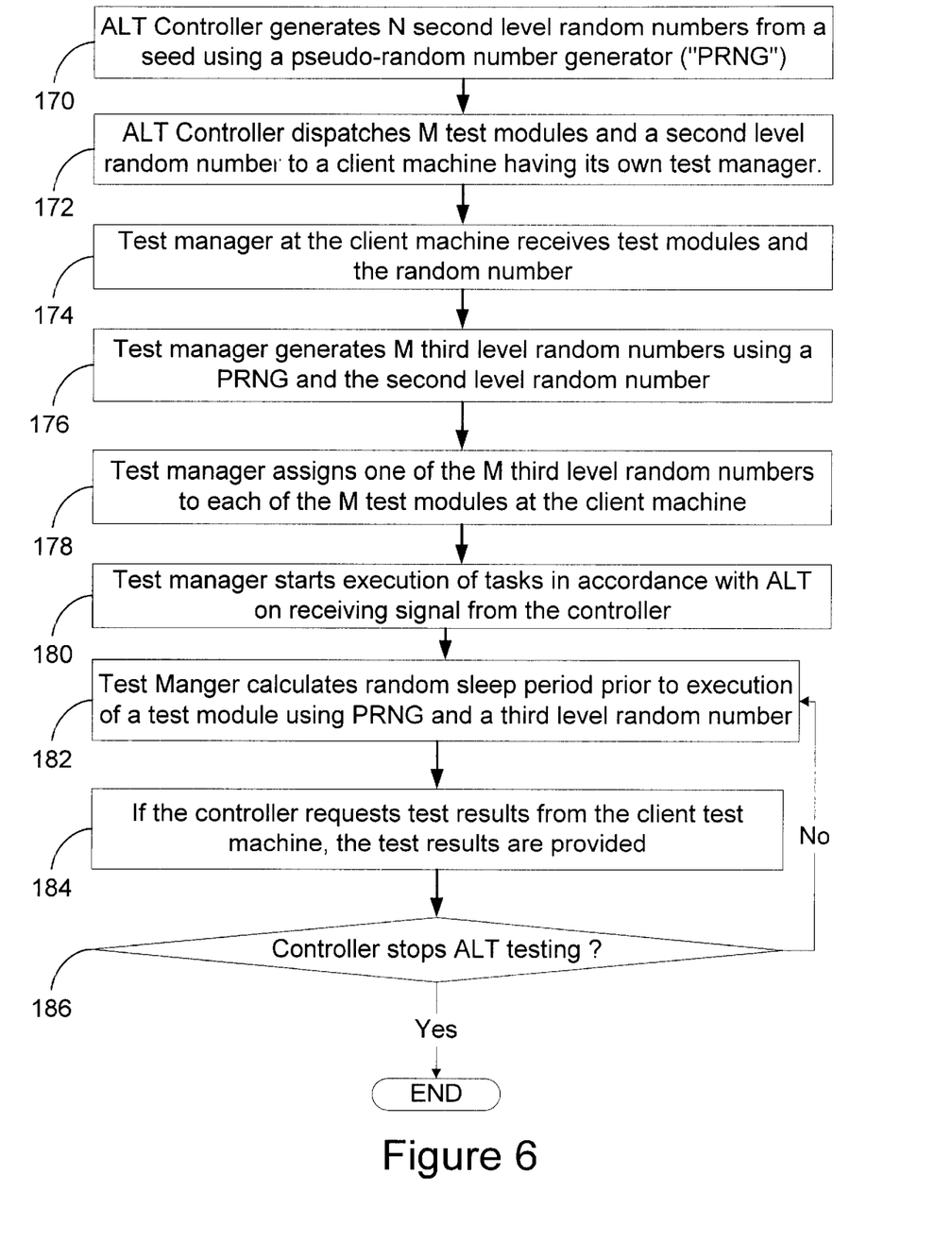
FIG. 6 illustrates another embodiment of the invention, compared to FIG. 5, using random numbers generation in the proposed ALT testing strategy.

FIG. 6 illustrates details in an embodiment of the invention in the context of FIG. 2. ALT controller 72 provides a seed, generated from a seed provided by the system or a user to each of N client machines having their own test managers (step 170). ALT controller 72 also dispatches M test modules to each of the test managers (step 172). The test manager at any one of the client machines receives the test modules (step 174) and generates M third level random numbers from the second level pseudo-random number received from the ALT controller (step 176). Each of the M third level random numbers is assigned to one of the test modules on the client machine in step 178.

Upon receiving a start signal from the ALT controller 72, the test manager 84 starts execution of a test module in the test module suite 82 (step 180). This is advantageously implemented by estimating a sleep period using a random number for each of the tasks followed by executing the tasks at the end of the sleep period. Now, the expected usage pattern is taken into account and in conjunction with a random number derived from the third level seed, an estimate of sleep time is made (step 182). Test modules are executed in accordance with the sleep (step 182) and test log is collected and provided to the ALT controller 72 (step 184) upon polling by the ALT controller 72 (step 184). In this simplified embodiment if the ALT controller 72 has not halted ALT, a cycle of task execution is initiated in step 186 by looping to step 182. Else, an exit is made from ALT to complete a test run. It should be noted that in other embodiments the response to the controller 72 halting ALT may not wait to complete an ongoing test or that the number of tests may be specified following which the test manager stops the testing automatically. Similar variations are possible for sending the test log to controller 72.

It should, however, be noted that the precise state of the server appliance is not captured by storing seeds for random numbers due inherent variations, e.g., lack of perfect clock synchronization and use of multithreaded architectures. However, failures detected are those due to sequences of operations by a user that are likely to be encountered in actual use at a sufficient rate to warrant correction. Hence, the accelerated execution of operations by a server in a short time while allowing sleep periods is sufficient for detecting problems of interest. Of course, a progressively more accurate record could be created by additionally including the local clock time and the like. Furthermore, even if a particular set of random numbers does not result in a failure while repeating ALT, the failure is likely to be detected and evaluated by making multiple runs with the same initial random number seeds. Thus, the ALT procedure allows for a thorough evaluation of reliability.

Table 3 provides a subset of typical data generated for a client machine testing a server operating system in a setup similar to that illustrated in FIG. 2 in accordance with the frequencies in Table 3:

TABLE 3

| client | Module | errors | last run | next run |
|---|---|---|---|---|
| SAPC3 | File Read | 0 | Mon Mar 06 17:36:55 | Mon Mar 06 18:30:29 |
| SAPC3 | File Write | 0 | Mon Mar 06 17:44:57 | Mon Mar 06 18:03:13 |
| SAPC3 | Folder Create/D | 0 | Mon Mar 06 15:29:33 | Mon Mar 06 18:26:43 |
| SAPC3 | Network Share Connect/D | 0 | Mon Mar 06 17:05:42 | Mon Mar 06 18:38:22 |
| SAPC3 | DHCP renew | 0 | Mon Mar 06 17:57:02 | Mon Mar 06 19:33:05 |
| SAPC3 | DHCP release/renew | 0 | N/A | Wed Mar 08 15:50:27 |
| SAPC3 | DHCP renew | 0 | N/A | N/A |
| SAPC3 | DHCP release | 0 | N/A | N/A |
| SAPC3 | Client Reboot | 0 | Mon Feb 28 14:33:44 | Tue Mar 07 01:03:24 |
| SAPC3 | User Add | 0 | N/A | Mon Mar 06 19:22:50 |
| SAPC3 | User Remove | 0 | Mon Feb 28 17:50:30 | Tue Mar 07 11:46:56 |
| SAPC3 | MSP Client/FTP | 0 | Mon Mar 06 17:17:15 | Mon Mar 06 18:16:08 |
| SAPC3 | Web walker | 8 | Mon Mar 06 17:24:44 | Mon Mar 06 18:35:45 |
| SAPC3 | Printer Map/U/Print | 0 | Mon Mar 06 17:54:56 | Mon Mar 06 18:28:21 |

Variations possible in having the ALT controller store as few as one seed or use several seeds independently to generate random numbers used subsequently via a pseudo random number generator are intended to be included within the scope of the invention. Such variations do not compromise the ability to reproduce the sequence of tasks executed by the server appliance 76 in response to client machines 80 without requiring extensive state information details to be captured.

In Table 3, many of the failures are encountered in course of accessing the Internet since "Web Walker" has 8 failures while other tasks result in no errors. Notably, each URL is accessed three times to ensure that the failure is not due to a congested Internet window or other reasons. The log includes the actual sites accessed as is seen in the excerpt shown below, where ">>>" represents a failure:

Test Log for Web Walker on Cient SAPC3
    run=12, return=0, time=512, start=Mon Feb 28 15:27:33 2000
    **** autosurf started
    >>>2/28/00 3:28:26 PM http://mspress.microsoft.com/ developer/ Microsoft Press: Learning and Training Solutions for Developers
    2/28/00 3:28:29 PM http://www.ibm.com/IBM About IBM
    2/28/00 3:28:41 PM http://www.zdnet.com/zdbop/ browserc/browserc.html BrowserComp home page
    >>>2/28/00 3:30:58 PM http://mspress.microsoft.com/ developer/ Microsoft Press: Learning and Training Solutions for Developers
    >>>2/28/00 3:33:31 PM http://mspress.microsoft.com/ developer/ Microsoft Press: Learning and Training Solutions for Developers
    >>>URL not reached >>>2/28/00 3:36:03 PM http:// mspress.microsoft.com/developer/ Microsoft Press: Learning and Training Solutions for Developers While the usual reason for such a failure, which is not a fatal error, is expired or non-functional URLs, it is possible to back track and investigate the actual cause if required in course of debugging. Expired URLs are not related to the reliability of the server operating system, and instead reflect third party actions/inaction.

The effectiveness of the invention is not limited to testing operating systems. For instance, testing of a modem that had previously passed extensive stress testing by various third parties, revealed a propensity to fail when subjected to ALT and the concomitant sleep and task periodicity. Similarly, in course of determining whether a particular amount of memory was sufficient for a server appliance of interest, it was subjected to stress testing which it passed. ALT testing, however, revealed a pattern of slow memory leaks that took place when the server appliance was operating with insufficient memory. This condition was created in ALT due to the randomized nature of the tasks, but was missed in stress testing.

Briefly, the invention includes estimating an expected usage pattern over a period of time for a software product, including software in a software/hardware hybrid such as a modem. The usage pattern is executed at a faster rate, but with sleep intervals interspersed between tasks scheduled in accordance with pseudo-random numbers or any other set of random variables so that reconstructing the events leading to a failure is possible. The faster pace of execution results in generating data relevant for operation of the software over a long period of time in a short time span while subjecting it to expected usage patterns. In an embodiment of the invention the test manager at a client machine receives several pieces of information from an ALT controller following which the client manager carries out ALT. In particular, the test manager receives from the ALT controller the initial seed, a compression ratio, a time period being evaluated, number of test modules and a start signal. The test manager uses the compression ratio and the time period being evaluated to calculate scheduling the number of test modules responsively to receiving the start signal in accordance with the accelerated life test using pseudo-random numbers as previously described.

Conveniently, the testing is coordinated by an ALT controller that initializes the software to be tested on the host machine and a plurality of testing modules. The ALT controller also provides a random number seed, which may be system provided or inputted by a user, and store the seed in association with the relevant test data. The ALT controller further collects and logs test data, preferably by polling the various machines for errors detected due to failed tasks. In accordance with an aspect of the embodiment, to minimize the efforts required in implementing the reporting system, the testing modules implementing the testing are prepared and distributed to the client machines by the ALT controller.

In view of the many possible embodiments to which the principles of this invention may be applied, it should be recognized that the embodiments described herein are meant to be illustrative only and should not be taken as limiting the scope of invention. For example, those of skill in the art will recognize that the elements of the illustrated embodiment shown in software may be implemented in hardware and vice versa or that the illustrated embodiment can be modified in arrangement and detail without departing from the spirit of the invention. Therefore, the invention as described herein contemplates all such embodiments as may come within the scope of the following claims and equivalents thereof.

We claim:

1. A software reliability reporting network comprising: software to be tested; a plurality of client machines capable of interacting with the software to be tested; a controller for managing testing of the software and for logging failure data for the software wherein the controller provides at least one seed to a client machine from the plurality of client machines for the generation of random numbers, wherein the seed provided to a client machine is stored for tracing failures; at least one pseudo-random number generator for generating random numbers from one or more seeds; and a plurality of client test suites for interacting with the software to be tested that can be invoked by the controller for execution by a client machine from the plurality of client machines in accordance with a schedule, the schedule comprising start times for one or more tasks in one of the plurality of client test suites, wherein, furthermore, the start times within a test interval of interest are computed using the random numbers generated by the random number generator, a desired probability distribution, and expected use of the software.

2. A software reliability reporting network as in claim 1, wherein the software to be tested is an operating system for a server.

3. A software reliability reporting network as in claim 1, wherein the software to be tested is a distributed application.

4. A software reliability reporting network as in claim 1, wherein the controller provides at least one schedule to one of the plurality of client machines for execution of at least one test module.

5. A software reliability reporting network as in claim 1, wherein at least one of the plurality of client test suites uses the random number generator to generate the schedule for the execution of a plurality of tasks in the client test suite and implements sleep periods between two consecutive tasks from the plurality of tasks in the client suite.

6. A software reliability reporting network as in claim 1, wherein the controller polls a machine hosting the software to be tested and the plurality of client machines to log failures during testing of the software.

7. A software reliability reporting network as in claim 1, wherein the controller is a distributed application.

8. A software reliability reporting network as in claim 7, wherein at least one of the test suites includes a test module that executes in its own process space.

9. A software reliability reporting network as in claim 1, wherein the controller stores an initial set of seeds for subsequently reconstructing a particular schedule implemented on at least one client machine from the plurality of client machines.

10. A software reliability reporting network as in claim 1, wherein the software to be tested is part of a software/hardware hybrid.

11. A method of generating a failure log in testing a software module, the software module interacting with a plurality of test modules and with a controller module, wherein the controller module coordinates the test modules and the software module, the method comprising the steps of: estimating a plurality of tasks to be performed by a software module over a first period of time; scheduling the plurality of tasks for one of the test modules in a second period of time using a plurality of pseudo-random numbers, wherein the plurality of pseudo-random numbers are computed from a set of seeds for generating random numbers using a random number generator and a selected distribution; storing the set of seeds for reconstructing a schedule for the plurality of tasks; storing identifiers corresponding to client machines; storing identifiers corresponding to client test suites; executing the plurality of tasks in the second period of time; and logging reliability of the software module in performing the plurality of tasks in the second period of time to estimate the reliability of the software module in the first period of time.

12. A method as in claim 11, wherein the step of scheduling the plurality of tasks further includes scheduling a sleep interval separating two tasks from the plurality of tasks.

13. A method as in claim 12, wherein the sleep interval is modified by a day_factor.

14. A method as in claim 12, wherein the sleep interval is modified by a night_factor.

15. A method as in claim 11, wherein the first period of time is at least one year and the second period of time is less than one month.

16. A computer-readable medium having computer-executable instructions for performing steps of a method of generating a failure log in testing a software module, the software module interacting with a plurality of test modules and with a controller module, wherein the controller module coordinates the plurality of test modules and the software module, the steps comprising: estimating a plurality of tasks to be performed by a software module over a first period of time; scheduling the plurality of tasks for one of the test modules in a second period of time using a plurality of pseudo-random numbers, wherein the plurality of pseudo-random numbers are computed from a set of seeds for generating random numbers using a random number generator and a selected distribution; storing the set of seeds for reconstructing a schedule for the plurality of tasks; storing identifiers corresponding to client machines; storing identifiers corresponding to client test suites; executing the plurality of tasks in the second period of time; and logging reliability of the software module in performing the plurality of tasks in the second period of time to estimate the reliability of the software module in the first period of time.

17. A computer-readable medium as in claim 16 further including computer-executable instructions for performing a step of polling to log failure information at the controller.

18. A computer-readable medium as in claim 16, wherein the step of scheduling the plurality of tasks includes scheduling a sleep interval separating two tasks from the plurality of tasks.

19. A computer-readable medium as in claim 18, wherein the step of scheduling the sleep interval separating two tasks from the plurality of tasks includes modifying the sleep interval by a day_factor to reflect a day activity level.

20. A computer-readable medium as in claim 18, wherein the step of scheduling the sleep interval separating two tasks from the plurality of tasks includes modifying the sleep interval by a night_factor to reflect a night activity level.

21. A controller for coordinating testing by a plurality of test modules of a software module, each of the plurality of test modules executed on one of a plurality of client machines physically connected to a machine hosting the controller and to a machine hosting the software module, the controller comprising: at least one random number seed storing instruction; a module for providing at least one first random number seed for generating random numbers using a random number generator to one of the plurality of client machines; a module for initializing the software module; a module for initializing a test module; a module for receiving and for logging test data from the one of the plurality of client machines; and a module for receiving and for logging test data from the one of the plurality of client machines corresponding to the random number seed provided to the one of the plurality of client machines.

22. The controller of claim 21 further comprising a module for receiving a user selection of a seed for generating a pseudo-random number, wherein the seed for generating a pseudo-random number is provided to the one of the plurality of client machines.

23. A client test manager for coordinating part of an accelerated life test on a client machine in evaluating reliability of a software module being tested, the client test manager receiving an initial seed for generating pseudo-random numbers using a random number generator, wherein a first pseudo-random number generated by the random number generator is used to generate a second-pseudo random number, the second pseudo-random number being used to schedule the execution, on the client machine, of a first test module in a test module suite by calculating a first sleep period following which the first test module is executed in a separate process space independent of any other test modules.

24. The client test manager of claim 23, wherein the client test manager generates a third pseudo-random number using the second pseudo-random number and schedules a second test module in the test module suite to execute on the client machine in a second test module's process space following a second sleep period, the second sleep period calculated using the third pseudo-random number.

25. The client test manager of claim 23 wherein the first sleep period is modified by a day_factor for a day test module to be executed during a day period following the first sleep period.

26. The test client manager of claim 23 wherein the first sleep period is modified by a night_factor for a night test module to be executed during a night period following the first sleep period.

27. The client test manager of claim 23 wherein the client test manager uses the first pseudo-random number, generated by the random number generator, to select a second test module in the test module suite to execute following a sleep period between execution of the first test module in the test module suite and execution of the second test module in the test module suite.

28. The client test manager of claim 23 wherein furthermore the client test manager provides accelerated life test data to a controller responsive to polling by the controller.

29. The client test manager of claim 28 wherein the controller provides the initial seed, a time compression ratio, a time period being evaluated, a number of test modules and a start signal to the client test manager, and wherein furthermore, the client test manager uses the time compression ratio and the time period being evaluated to calculate scheduling the number of test modules responsively to receiving the start signal in accordance with the accelerated life test.

\* \* \* \* \*